US010135283B2

(12) United States Patent
Byun et al.

(10) Patent No.: US 10,135,283 B2
(45) Date of Patent: Nov. 20, 2018

(54) METHOD AND POWER TRANSMITTER FOR CONTROLLING POWER TRANSMISSION AGAINST OVERVOLTAGE AT POWER RECEIVER

(71) Applicant: Samsung Electronics Co., Ltd., Gyeonggi-do (KR)

(72) Inventors: Kang-Ho Byun, Gyeonggi-do (KR); Kyung-Woo Lee, Seoul (KR); Hyuk-Choon Kwon, Seoul (KR); Nam-Yun Kim, Seoul (KR); Hee-Won Jung, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 657 days.

(21) Appl. No.: 13/922,961

(22) Filed: Jun. 20, 2013

(65) Prior Publication Data
US 2013/0342161 A1    Dec. 26, 2013

(30) Foreign Application Priority Data

Jun. 20, 2012    (KR) ................. 10-2012-0066418
Jul. 30, 2012    (KR) ................. 10-2012-0083128

(51) Int. Cl.
*H02J 7/00*    (2006.01)
*H02J 7/02*    (2016.01)
(Continued)

(52) U.S. Cl.
CPC ............ *H02J 7/025* (2013.01); *H02J 5/005* (2013.01); *H02J 50/12* (2016.02); *H02J 50/40* (2016.02);
(Continued)

(58) Field of Classification Search
CPC ........... H02J 7/025; H02J 50/00–50/90; B60L 11/182; B60L 11/1829; B60L 11/1831
(Continued)

(56) References Cited

U.S. PATENT DOCUMENTS

2004/0145342 A1*  7/2004  Lyon ............... H02J 7/025
                                                320/108
2007/0021140 A1*  1/2007  Keyes, IV ......... H02J 17/00
                                                455/522
(Continued)

FOREIGN PATENT DOCUMENTS

CN    101841177    9/2010
CN    102315665    1/2012
(Continued)

OTHER PUBLICATIONS

European Search Report dated Mar. 21, 2016 issued in counterpart application No. 13807342.4-1804, 10 pages.
(Continued)

*Primary Examiner* — Drew A Dunn
*Assistant Examiner* — Zixuan Zhou
(74) *Attorney, Agent, or Firm* — The Farrell Law Firm, P.C.

(57) ABSTRACT

Methods and apparatus are provided for controlling power transmission in a power transmitter against overvoltage at a power receiver. The power transmitter receives a subscription request to subscribe to a wireless power network, from the power receiver. It is determined whether power transmission is available for the power receiver. The power receiver is informed that the power transmission is beginning, when the power transmission is available. The transmission power is increased and transmitted. It is determined whether a stop request to stop increasing voltage is received at the power transmitter from the power receiver. The increase of the transmission power is stopped when the stop request is received at the power transmitter. Charging of the power receiver is started by transmitting a start charging command from the power transmitter to the power receiver.

20 Claims, 4 Drawing Sheets

(51) Int. Cl.
  *H02J 50/90* (2016.01)
  *H02J 5/00* (2016.01)
  *H04B 5/00* (2006.01)
  *H02J 50/40* (2016.01)
  *H02J 50/12* (2016.01)
  *H02J 50/80* (2016.01)

(52) U.S. Cl.
  CPC .............. *H02J 50/80* (2016.02); *H02J 50/90* (2016.02); *H04B 5/0037* (2013.01); *H02J 2007/0096* (2013.01); *Y02B 40/90* (2013.01)

(58) Field of Classification Search
  USPC .......................................... 320/108; 307/104
  See application file for complete search history.

(56) References Cited

U.S. PATENT DOCUMENTS

| | | | | |
|---|---|---|---|---|
| 2009/0271047 | A1* | 10/2009 | Wakamatsu | H02J 5/005 700/295 |
| 2009/0281678 | A1* | 11/2009 | Wakamatsu | H02J 5/005 700/296 |
| 2010/0013322 | A1* | 1/2010 | Sogabe | H04B 5/0093 307/104 |
| 2010/0066304 | A1* | 3/2010 | Oshimi | H02J 7/025 320/108 |
| 2010/0181961 | A1 | 7/2010 | Novak et al. | |
| 2011/0140538 | A1* | 6/2011 | Jung | H02J 7/0027 307/104 |
| 2011/0231029 | A1 | 9/2011 | Ichikawa et al. | |
| 2012/0007547 | A1 | 1/2012 | Kim | |
| 2012/0049644 | A1 | 3/2012 | Choi et al. | |
| 2012/0235509 | A1* | 9/2012 | Ueno | H02J 5/005 307/104 |
| 2013/0162206 | A1 | 6/2013 | Takeuchi et al. | |
| 2013/0285620 | A1* | 10/2013 | Yamamoto | H02J 7/0029 320/155 |

FOREIGN PATENT DOCUMENTS

| | | |
|---|---|---|
| JP | 2009-268310 | 11/2009 |
| JP | 2009-278707 | 11/2009 |
| KR | 101046659 | 7/2011 |
| WO | WO 2012/029829 | 3/2012 |

OTHER PUBLICATIONS

Chinese Office Action dated Apr. 29, 2016 issued in counterpart application No. 201380031937.9, 9 pages.
Korean Office Action dated Jul. 18, 2018 issued in counterpart application No. 10-2012-0083128, 11 pages.

* cited by examiner

| Frame Type | Status | Sequence Number | Network ID | Schedule Management |
|---|---|---|---|---|
| Notice | 4 bits | 1 byte | 1 byte | 1 byte |

| Status Type | | |
|---|---|---|
| Bits | Command | Contents |
| 0000 | Normal | |
| 0001 | Change channel | Channel 1 |
| 0010 | Change channel | Channel 5 |
| 0011 | Change channel | Channel 9 |
| 0100 | Change channel | Channel 14 |
| 0101 | Leaving | |
| 0110-0111 | Reserved | |
| 1000 | Error | Rogue device |
| 1001 | Emergency | OVP |
| 1010 | Emergency | OCP |
| 1011 | Emergency | OTP |
| 1100-1111 | Reserved | |

FIG. 4

METHOD AND POWER TRANSMITTER FOR CONTROLLING POWER TRANSMISSION AGAINST OVERVOLTAGE AT POWER RECEIVER

PRIORITY

This application priority under 35 U.S.C. § 119(a) to Korean Patent Applications filed in the Korean Intellectual Property Office on Jun. 20, 2012 and Jul. 30, 2012, and assigned Serial Nos. 10-2012-0066418 and 10-2012-0083128, respectively, the contents of which are incorporated herein by reference.

BACKGROUND OF THE INVENTION

1. Field of the Invention

The present invention relates generally to a wireless power transmission system, and more particularly, to a method of controlling power transmission in a power transmitter against overvoltage at a power receiver.

2. Description of the Related Art

Wireless charging technology, or contactless charging technology, has recently been developed and applied to many different electronic devices. The wireless charging technology, using wireless power transmission and reception, enables, for example, a battery of a cell phone to be automatically charged by placing the cell phone on a charging pad, without requiring a separate charging connector. The wireless charging technology wirelessly charges electronic products and eliminates the need for a wired charger, thus contributing to waterproofing and portability of the electronic products.

In a resonance-based charging method, when a power receiver, requiring charging, is located in a power transmission area of a power transmitter for transmitting wireless power, the power transmitter may charge the power receiver. When the power receiver provides power information for the power transmitter, the power transmitter transmits the power demanded by the power receiver, to the power receiver. The power receiver starts charging only after receiving a start charging command.

As described above, after receiving the start charging command, the power receiver starts charging, e.g., by controlling a switch to be connected to the charger (or battery). However, since the power transmitter transmits power immediately after completing preparations of the power transmission, voltage that is input to the power receiver may increase to overvoltage, which may damage the circuit on the power transmission line at the power receiver.

Furthermore, when another power receiver is already performing charging in the charging area, the transmission power of the power transmitter for the other power receiver may decrease to a point where charging of the other power receiver might be stopped.

SUMMARY OF THE INVENTION

The present invention has been made to address at least the above problems and/or disadvantages and to provide at least the advantages described below. Accordingly, an aspect of the present invention provides an apparatus and method of controlling power transmission of the power transmitter in consideration of overvoltage at the power receiver.

Another aspect of the present invention provides an apparatus and method of preventing occurrence of overvoltage while transmitting power demanded by the power receiver when a charging phase begins.

An additional aspect of the present invention provides an apparatus and method of stepping up transmission power in transmitting power demanded by a power receiver.

In accordance with an aspect of the present invention, a method is provided for controlling power transmission in a power transmitter against overvoltage at a power receiver. The power transmitter receives a subscription request to subscribe to a wireless power network, from the power receiver. It is determined whether power transmission is available for the power receiver. The power receiver is informed that the power transmission is beginning, when the power transmission is available. The transmission power is increased and transmitted. It is determined whether a stop request to stop increasing voltage is received at the power transmitter from the power receiver. The increase of the transmission power is stopped when the stop request is received at the power transmitter. Charging of the power receiver is started by transmitting a start charging command from the power transmitter to the power receiver.

In accordance with another aspect of the present invention, a power transmitter is provided for controlling power transmission against overvoltage at a power receiver. The power transmitter includes a wireless communication unit for receiving a subscription request to subscribe to a wireless power network from the power receiver. The power transmitter also includes a resonant signal generator for supplying transmission power to the power receiver under control of the controller. The power transmitter further includes a controller for determining whether power transmission is available for the power receiver, informing the power receiver through the wireless communication unit that power transmission is beginning when the power transmission is available, increasing and transmitting the transmission power using the resonant signal generator, determining whether a stop request to stop increasing voltage is received from the power receiver through the wireless communication unit, stopping the increase of the transmission power when the stop request is received, and starting charging of the power receiver by transmitting a start charging command to the power receiver through the wireless communication unit.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF EMBODIMENTS OF THE PRESENT INVENTION

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

Embodiments of the present invention provide an apparatus and a method of preventing occurrence of overvoltage at a power receiver while transmitting power demanded by a power receiver when a charging phase begins. According to embodiments of the present invention, if a subscription request to subscribe to a wireless power network hosted by a power transmitter is made by a power receiver, it is determined whether power transmission for the power receiver is available based on power information of the power receiver. If the power transmission is available, the power receiver is informed that phased power transmission will be started. Transmission power is stepped up and transmitted until a request to stop increasing voltage is received from the power receiver. If the request to stop increasing voltage is received, increasing the transmission power is stopped and charging is started by sending a start charging command. Accordingly, embodiments of the present invention preventing occurrence of overvoltage in transmitting power demanded by a power receiver when a charging phase begins.

Figure 1:
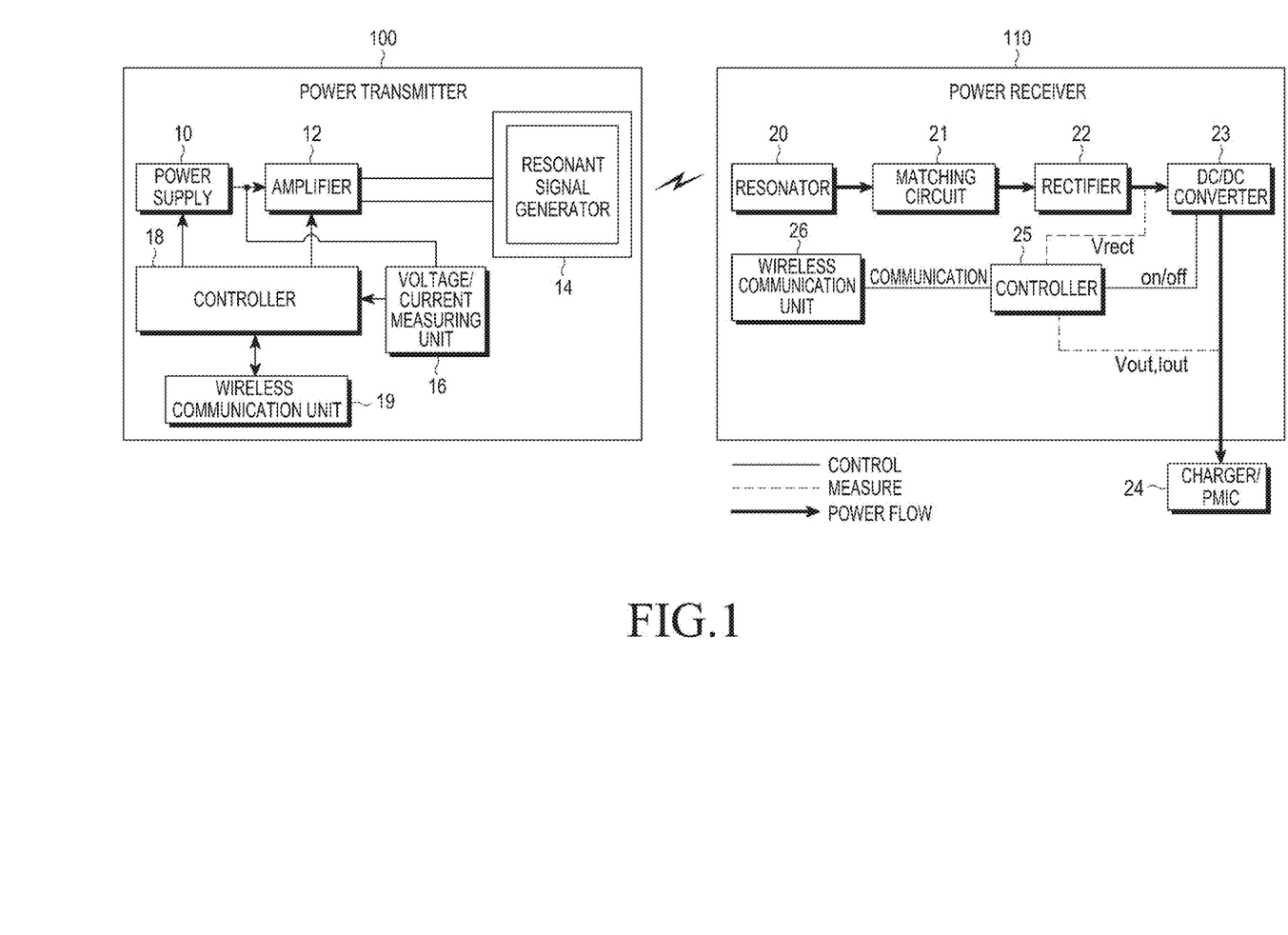
FIG. 1 is a block diagram illustrating a power transmitter and a power receiver, according to an embodiment of the present invention.

FIG. 1 is a block diagram of a power transmitter 100 and a power receiver 110 constituting a wireless power transmission system, according to an embodiment of the present invention. In FIG. 1, the power transmitter 100 and the power receiver 110 are shown to be connected one to one. However, the wireless power transmission system of the present invention may also include one or more power transmitters 100 and one or more power receivers 110. The power receiver may be embodied as a cell phone, a Personal Digital Assistant (PDA), an Moving Picture Experts Group (MPEG)-1 or MPEG-2 Audio Layer III (MP3) device, a laptop computer, a camera, or any kind of electronic device.

Referring to FIG. 1, the power transmitter 100 is configured to include a power supply 10 having, e.g., a Voltage Control Oscillator (VCO) for supplying power to generate a resonant frequency signal determined for a controller 18. The power transmitter 100 also includes an amplifier 12 for amplifying the signal generated by the power supply 10 according to the power supplied from the power supply 10. The power transmitter 100 additionally includes a resonant signal generator 14 for transmitting the power from the power supply 10 in a wireless resonant signal according to the high-amplitude signal generated by the amplifier 12. The power transmitter further includes a voltage/current measuring unit 16 for measuring the voltage and current generated by the power supply 10. The controller 18 controls general wireless power transmit operations of the power transmitter 100. In particular, the controller 18 monitors a voltage and current of the wirelessly transmitted resonant signal according to a voltage and current detected at the voltage/current measuring unit 16, and controls operations of the power supply 10 and the amplifier 12 to maintain the voltage and current of the resonant signal to be in a preset normal range. The power transmitter 100 also includes a wireless communication unit 19 configured to employ one of a variety of wireless short range communication schemes to communicate with the power receiver 110 in relation to wireless power transmission operations under control of the controller 18. The resonant signal generator 14 includes a charging substrate, on which the power receiver may be disposed, in an upper part of the resonant signal generator 14.

The controller 18 of the power transmitter 100 may be configured with, e.g., a Micro Controller Unit (MCU). Operations of controlling the power transmitter 100 to transmit power demanded by the power receiver 110, when the charging phase begins, are described in detail below.

According to an embodiment of the present invention, the power receiver 110 may be on standby for receiving power from the power transmitter 100 and starting charge, or may already be performing charging while receiving power from the power transmitter 100. A structure of the power receiver 110 is illustrated in FIG. 1.

The power receiver 110 includes a resonator 20 for receiving the wireless resonant signal transmitted from the resonant signal generator 14 of the power transmitter 100. The power receiver 110 also includes a rectifier 22 for rectifying the power in an Alternate Current (AC) form received via a matching circuit 21 to be in a Direct Current (DC) form. The power receiver 110 additionally includes a DC/DC converter 23 (also referred to as a constant voltage generator) for converting power outputted from the rectifier 22 into an operating power (e.g., +5V) demanded by, e.g., a portable terminal established with the power receiver 110. The power receiver 110 further includes an external charger/ Power Management Integrated Circuit (PMIC) 24 for being charged with the operating power. The power receiver 110 also includes a controller 25 for measuring a voltage outputted from the rectifier 22 and inputted to the DC/DC converter 23, i.e., an input voltage Vin, an output voltage Vout, and an output current Iout from the DC/DC converter 23. The controller 25 may be configured with an MCU, and may determine a power receiving condition based on the measured voltage/current information, and provide information about the power receiving condition. In FIG. 1, the controller 25 is shown to measure the voltage and the current, but the power receiver 110 may further include a voltage/current measuring unit for measuring voltage/current.

A wireless communication unit 26 of the power receiver 110 is configured to employ one of a variety of wireless short range communication schemes to communicate with the power transmitter 100 in relation to the operations of the wireless power reception under control of the controller 25.

When the power receiver enters into the charging area of the power transmitter 100 and makes a request for subscription to a wireless power network controlled by the power transmitter 100, knowing that phased power transmission has begun, the controller 25 of the power receiver 110 measures the input voltage Vin in a short period. A load switch of the power receiver 110, connected to the external charger 24, is in an Off state until the start charging command is received. Although FIG. 1 shows on/off control to the DC/DC converter 23, 'charging' means power transmission to an external charger 24. For example, the load switch between the DC/DC converter 23 and the external charger 24 may be used to apply/cut off the power transmission.

If the measured input voltage Vin reaches a predetermined threshold voltage, the controller 25 sends the power transmitter 100 a stop request to stop the phased power transmission through the wireless communication unit 26. A report frame may be used for transmission of the stop request. Thus, the power transmitter 100 stops an operation of stepping up the transmission power, when the report frame is received from the power receiver 110. The predetermined threshold voltage is determined between a maximum voltage Vmax receivable at the power receiver 110 and a reference voltage Vhigh. The reference voltage Vhigh is used to divide a range between minimum and maximum voltages Vmin and Vmax into predetermined portions. A portion (range) between the reference voltage Vhigh and the minimum voltage Vmin represents a range having relatively good power reception efficiencies at the power receiver 110.

The threshold voltage may be determined to be one for dividing a portion (range) between the maximum voltage Vmax and the reference voltage Vhigh into predetermined portions. An example of the threshold voltage may be obtained in the following manner. For example, assuming that the maximum voltage Vmax is 24 V, the reference voltage Vhigh is 14 V, and division percentage is 50%, the threshold voltage may be calculated based on Equation (1) below.

Threshold Voltage=Reference Voltage (Vhigh)+
(Maximum Voltage (Vmax)−Reference Voltage
(Vhigh))*0.5     (1)

In Equation (1), the threshold voltage is 14+((24−14)* 0.5)=19 V. Specifically, during the phased power transmission, if the input voltage Vin measured by the controller 25 of the power receiver 110 is greater than 19 V, the controller 25 sends the power transmitter 100 a request to stop the phased power transmission.

Knowing that the phased power transmission has been stopped, the controller 25 may change the load switch connected to the external charger 24 to be in an ON state. Alternatively, the controller 25 may keep the load switch in an OFF state, and change it to be in an ON state when receiving, e.g., a start charging command that indicates a start of charging. For example, receiving a notification frame from the power transmitter 100 indicating completion of the phased power transmission, i.e., completion of an operation of the power transmitter 100 to step up the transmission power by a certain step, the controller 25 may change the load switch to be in an ON state.

Aside from the power receiver 110 that newly starts charging, at least one other power receiver may already be performing charging while receiving the power from the power transmitter 100.

The at least one other power receiver also measures the input voltage Vin in a short period in the same manner as the power receiver 110. Since the other power receiver is already performing charging, the load switch connected to the external charger 24 is in an ON state. However, if the measured input voltage Vin reaches the threshold voltage, the at least one other power receiver already performing charging may also send the power transmitter 100 a request to stop the phased power transmission. The threshold voltage may vary for each of the at least one other power receiver because the reference voltage Vhigh and the maximum voltage Vmin for each power receiver is distinct.

Operations of the power transmitter 100 and the power receiver 110 with the foregoing configurations are described in detail below with reference to FIG. 2, according to an embodiment of the present invention. A change in the wireless charging conditions, in an embodiment of the present invention, may be classified into a load detection phase, a search phase, a registration phase, a standby phase, and a charging phase. Changing of the power in phases at the power transmitter is described in detail below with reference to FIG. 3, according to an embodiment of the present invention.

Figure 2:
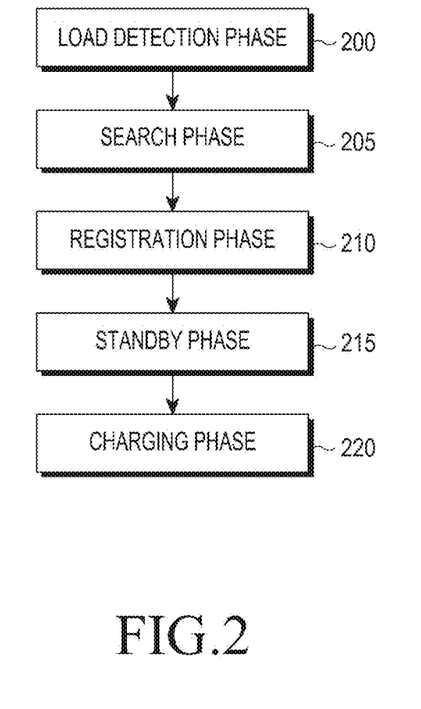
FIG. 2 is a flow diagram illustrating operation of the power transmitter and the power receiver, according to an embodiment of the present invention.
Figure 3:
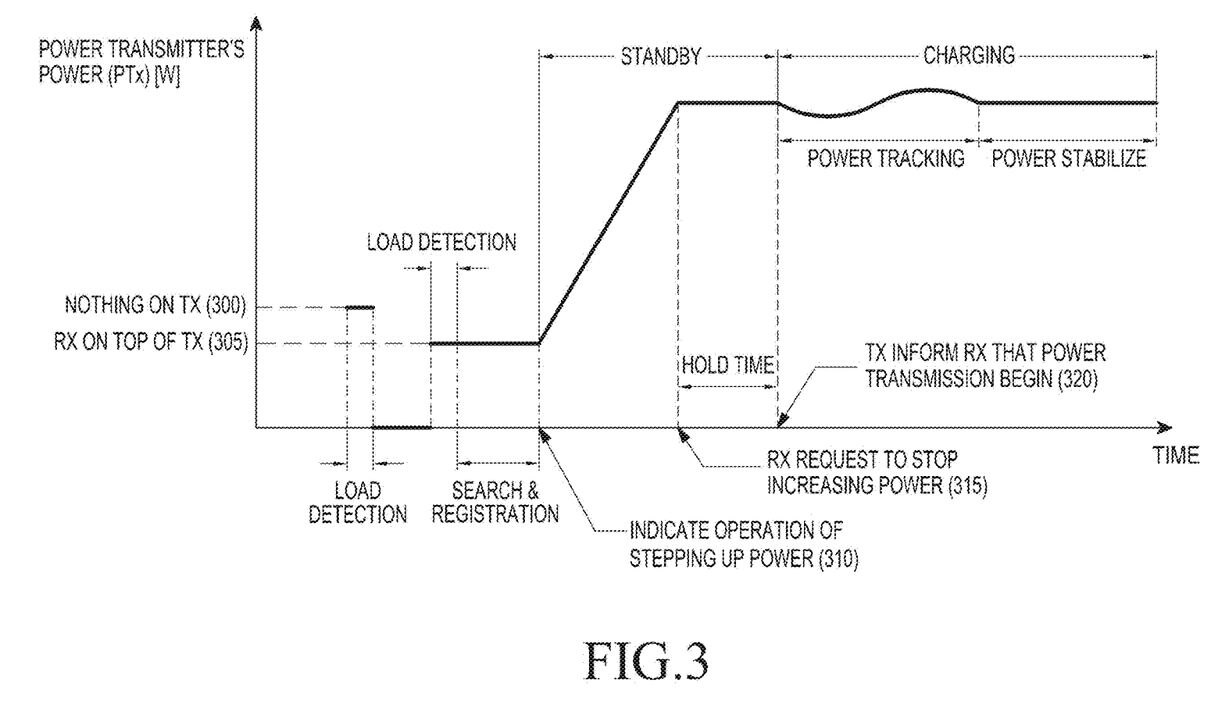
FIG. 3 is a diagram illustrating a method of controlling power transmission in the power transmitter, according to an embodiment of the present invention.

Referring to FIG. 2, in a load detection phase 200, the power transmitter transmits a certain level of power for a predetermined measurement period of time to detect a load change. If a power receiver is located on the power transmitter, a power 305 with the power receiver on top of the power transmitter differs from a power 300 when there is nothing on the power transmitter, as shown in FIG. 3 Once the load change is detected in the above manner, the power transmitter determines that the power receiver is located in the charging area of the power transmitter, a phase of which is defined as the load detection phase 200.

In a search phase 205, the power transmitter searches for an effective power receiver by transmitting power to drive the power receiver. The power receiver is driven by receiving the power from the power transmitter, and searches for a nearby power transmitter to register in a wireless power network, by sending a search frame.

In wireless power transmission and reception methods of embodiments of the present invention, the search frame has a structure as shown below in Table 1.

TABLE 1

| Frame Type | Protocol Version | Sequence Number | Company ID | Product ID | Impedence | Category |
|---|---|---|---|---|---|---|
| Search | 4 bits | 1 byte | 1 byte | 4 bytes | 4 bits | 4 bits |

In the foregoing description, the power receiver informs the power transmitter of values of a category and impedance by using the search frame, and the power transmitter determines whether the power receiver is effective based on the values of the category and impedance from the power receiver. The power transmitter may be able to know of the size of the resonator, charging capacity, etc., of the power receiver based on the category information.

Specifically, when measuring an actual voltage by using the value of impedance received from the power receiver, the power transmitter determines that the power receiver is an effective power receiver if the measured voltage results from reflection of the impedance. If the power transmitter is transmitting power to one or more power receivers, it authenticates the power receivers in consideration of the fact that each power receiver has a different impedance value.

Once the effectiveness of a power receiver is determined through the foregoing procedure, the power receiver may make a request to subscribe to a wireless power network controlled by the power transmitter. Thus, in a registration phase 210, the power receiver subscribes to the wireless power network controlled by the power transmitter. The power receiver may subscribe to the wireless power network by sending a subscription request to the power transmitter and in return receiving a subscription response. A frame for the subscription request includes a network identifier (ID), a power receiver ID, information of minimum and maximum voltages V_min and V_max receivable at the power receiver, a reference output voltage (or typical output voltage), a reference output current (or typical output current), etc. The minimum voltage V_min and the maximum voltage V_max are designed based on a charging capacity, according to the category (charging capacity, size of resonator).

A structure of a subscription request frame to be used for the subscription request, and information included in the subscription request frame, are shown below in Table 2.

TABLE 2

| Frame Type | Protocol Version | Sequence Number | Network ID | Product ID | Input Voltage Min | Input Voltage Max | Typical Output Voltage | Typical Output Current |
|---|---|---|---|---|---|---|---|---|
| Request Join | 4 bits | 1 byte | 1 byte | 4 bytes | 1 byte | 1 byte | 1 byte | 1 byte |

Referring to Table 2, the power may be obtained by multiplying the reference output voltage by the reference output current. The power transmitter 100 may know of the power the power receiver supplies to the charger 24.

Thus, the power transmitter 100 stores the ID information and the power information, such as, for example, impedance, category, etc., from the search frame, and stores a protocol version, and the power information, such as minimum and maximum voltages, reference output voltage and current, etc. from the subscription request frame.

Figure 4:
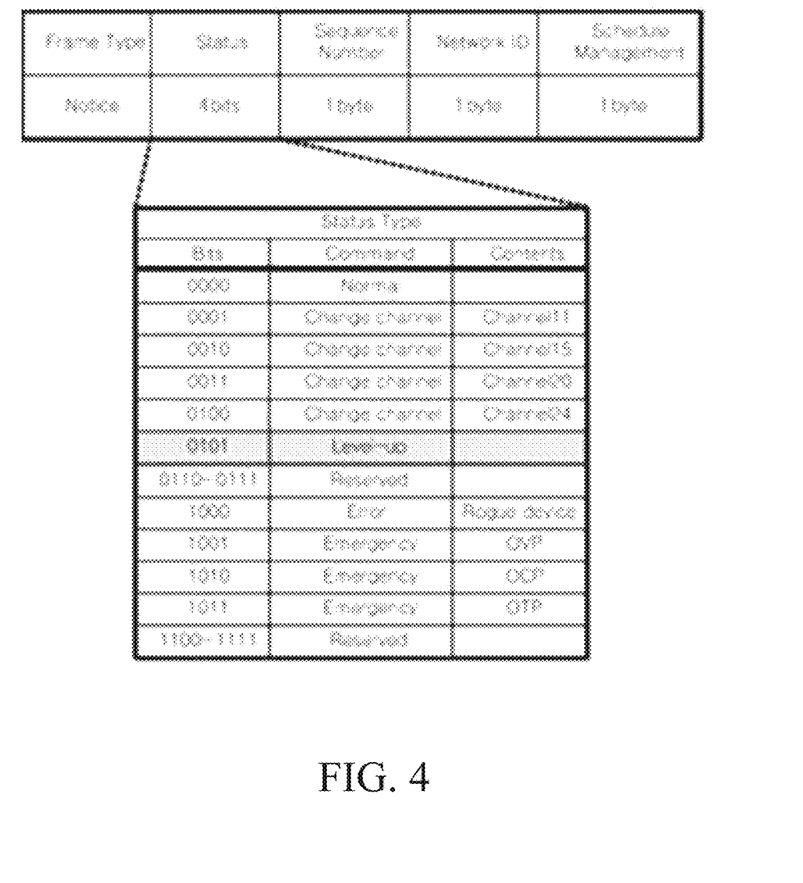
FIG. 4 is a table showing information set up in status fields in a notification frame, according to an embodiment of the present invention.

Once the registration phase 210 is completed through the foregoing procedure, the power transmitter may obtain the power value for the power receiver based on the power information stored in the registration phase. The power transmitter may determine if charging is available for the power receiver based on the obtained power value for the power receiver. When it is determined that charging is available, the power transmitter informs the power receiver that phased power transmission begins. A notification frame having information to indicate that the phased power transmission begins may be used, and the information may be set up in status fields in the notification frame, as shown in FIG. 4.

The notification frame may be delivered to a newly joined power receiver, or may be delivered to all power receivers already performing charging or on standby for charge. The phased power transmission, i.e., notification 310 about operations of power transmission in phases, may be notified when the power receiver enters into a standby phase 215.

The standby phase 215 begins, in which the power receiver 110 is on standby until receiving the start charging command from the power transmitter 100, and during which actual charging is not performed. After notifying the power receiver 110 that the phased power transmission begins, the power transmitter 100 gradually steps up and transmits the transmission power at an interval until receiving a request to stop increasing voltage from the power receiver 110. The phased power transmission means an operation of stepping up an amount of the transmission power the power transmitter 100 transmits, and may be performed by the controller 18 delivering a voltage value to a variable DC power supply, i.e., the power supply 10 to adjust voltage and thus increase the amount of the transmission power.

The operation of gradually stepping up the transmission power at an interval will be described in greater detail below. The interval of the operation of performing the phased power transmission may be, in general, one cycle (e.g., before transmission of a next notification frame). A length of a phase of increasing the transmission power may be determined by using the power value that the power receiver supplies to its charger, which is calculated by the power transmitter 100.

For example, the power value may be obtained by multiplying the reference output voltage and the reference output current, and is assumed to be 2.5 W. It is also assumed that the one cycle is 250 ms, the length of a phase is 5 ms, and the transmission efficiency is 50%. In this case, the transmission power may be stepped up 50 times. Specifically, since the power value 2.5 W/the transmission efficiency 50%=5 W, 5 W is divided by 50 times for the phased power transmission. Thus, a stepped-up power per phase is 0.1 W. The power transmitter measures current Itx between the power supply 10 and the amplifier 12. The power transmitter may obtain a voltage to be stepped up by measuring the current Itx before measuring voltage during the phased power transmission, and dividing the current Itx by 0.1 W. When the current Itx value is 100 mA, stepping up 1 V may lead to stepping-up of 0.1 W. Thus, knowing of the power value, the power transmitter may determine how often and how much it has to increase the transmission power, and transmits the transmission power by stepping up in the foregoing manner until receiving from the power receiver a stop request to stop increasing the voltage.

As in FIG. 3, receiving a stop request 315 from any one of the newly joined power receiver and other power receivers already performing charging, the power transmitter stops operation of stepping up the transmission power. The power receiver 110 may use a report frame to send the stop request 315. Upon reception of the report frame, the power transmitter 100 stops the operation of stepping up and transmitting transmission power. When the stop request 315 is received, the power transmitter 100 may stop the increase of the transmission power and keep a current level of the transmission power. FIG. 3 shows a period of time for which to keep the transmission power, i.e., a hold time, which may, however, be varied or skipped.

As described above, upon completion of the operation of the phased power transmission, the power transmitter 100 informs the power receiver 110 of a start of the power transmission, i.e., a start of charging. The start of charging may be informed by a start charging command. In this regard, the power transmitter 100 may stop the operation of the phased power transmission before informing a newly joined power receiver of the start of charging. Specifically, the power transmitter 100 informs the power receiver 110 of completion of the phased power transmission in a notification frame for broadcasting. After completing the phased power transmission, the power transmitter 100 may also inform, not only the newly joined power receiver, but also other power receivers performing charging or in standby for charging, of the completion of the phased power transmission.

A charging phase 220 of FIG. 2 indicates that the power receiver 110 begins charging upon reception of the start charging command and performs charging when the controller 25 sends a command to control the DC/DC converter 23 to be ON. Although FIG. 1 shows on/off control to the DC/DC converter 23, 'charging' means power transmission to the external charger 24. Thus, the load switch between the DC/DC converter 23 and the external charger 24 is controlled to be in an On state to supply power to the external charger 24. According to an embodiment of the present invention, the power transmitter may prevent damage to the power receiver that may be caused due to overvoltage at the power receiver by gradually stepping up and transmitting power before a start of the charging phase.

Accordingly, embodiments of the present invention are advantageous in that the power transmitter is enabled to control power by taking into account various charging conditions, such as, for example, the power receiver's characteristics, charging condition, etc., and thus, control efficient power transmission.

The embodiments of the present invention also prevent occurrence of overvoltage at the power receiver by gradually stepping up and transmitting power demanded by the power receiver. When there are other power receivers already performing charging, embodiments of the present invention prevent charging of other power receivers from being interrupted.

While the invention has been shown and described with reference to certain embodiments thereof, it will be understood by those skilled in the art that various changes in form and detail may be made therein without departing from the spirit and scope of the invention as defined by the following claims.

What is claimed is:

1. A method of controlling power transmission in a power transmitter, the method comprising the steps of:
    receiving a message including voltage information from a power receiver;
    determining whether charging is available for the power receiver based on the message;
    in response to the charging being available, transmitting power to the power receiver;
    increasing an amount of the power until receiving a stop request from the power receiver; and
    stopping the increasing of the amount of the power in response to the stop request and maintaining the power with the amount at which the increasing is stopped.

2. The method of claim 1, further comprising transmitting a notification frame that comprises information indicating that the power transmission is beginning.

3. The method of claim 2, wherein the information indicating that the power transmission is beginning is set up in a status field in the notification frame.

4. The method of claim 1, wherein the message comprises at least one of piece of power information, which includes an identifier (ID) of the power receiver, a protocol version for communication, minimum and maximum voltages of the power receiver, and a reference output voltage and a reference output current of the power receiver.

5. The method of claim 4, further comprising:
    determining whether power transmission is available for the power receiver based on the reference output voltage and the reference output current from among the pieces of the power information, in response to receiving the message.

6. The method of claim 1, wherein increasing the amount of the power comprises, increasing the amount of the power in phases after informing the power receiver that the power transmission is beginning.

7. The method of claim 6, wherein a length of a phase is calculated based on a reference output voltage and a reference output current included in power information of the power receiver.

8. The method of claim 1, wherein the transmitting the power with the amount at which the increasing is stopped comprising maintaining a current level of the transmission power, in response to the increase of the power being stopped.

9. The method of claim 1, further comprising:
    in response to identifying that there is at least one other power receiver in addition to the power receiver, informing the at least one other power receiver that the power transmission is beginning for the power receiver.

10. The method of claim 1, further comprising:
    in response to identifying that there is at least one other power receiver in addition to the power receiver, stopping the increase of the power and informing the power receiver and the at least one other power receiver that an operation of increasing the power is stopped.

11. The method of claim 1, further comprising:
    determining whether a load change is detected in a predetermined period;
    transmitting power to drive the power receiver, in response to the load change being detected;
    receiving a search request from the power receiver in response to transmitting the power to the power receiver;
    transmitting a reply for the search request to the power receiver; and receiving the message from the power receiver.

12. A power transmitter for controlling power transmission, the power transmitter comprising:
    a wireless communication unit; and
    a controller configured to:
        receive, through the wireless communication unit, a message including voltage information from the power receiver;
        determine whether charging is available for the power receiver based on the message, through the wireless communication unit;
        in response to the charging being available, transmit power to the power receiver;
        increase an amount of the power until receiving a stop request from the power receiver; and
        stop the increasing of the amount of the power in response to the stop request and maintain the power with the amount at which the increasing is stopped.

13. The power transmitter of claim 12, wherein the controller transmits a notification frame that comprises information indicating that the power transmission is beginning through the wireless communication unit.

14. The power transmitter of claim 13, wherein the information indicating that the power transmission is beginning is set up in a status field in the notification frame.

15. The power transmitter of claim 12, wherein the message comprises at least one of piece of power information, which includes an identifier (ID) of the power receiver, a protocol version for communication, minimum and maximum voltages of the power receiver, and a reference output voltage and a reference output current of the power receiver.

16. The power transmitter of claim 15, wherein the controller determines whether the power transmission is available for the power receiver based on the reference output voltage and the reference output current from among the pieces of the power information.

17. The power transmitter of claim 12, wherein the controller increases the amount of the power in phases after informing the power receiver that the power transmission is beginning.

18. The power transmitter of claim 17, wherein a length of a phase is calculated based on a reference output voltage and a reference output current included in power information of the power receiver.

19. The power transmitter of claim 12, wherein, in response to identifying that there is at least one other power receiver that is performing charging in addition to the power receiver, the controller informs the at least one other power receiver that the power transmission is beginning for the power receiver.

20. The power transmitter of claim 12, wherein, in response to identifying that there is at least one other power receiver that is performing charging in addition to the power receiver, the controller stops increasing the power and informs the power receiver and the at least one other power receiver that an operation of increasing the power is stopped.

* * * * *